US012602008B2

(12) United States Patent
Di Domenico et al.

(10) Patent No.: US 12,602,008 B2
(45) Date of Patent: Apr. 14, 2026

(54) HOROLOGICAL REGULATING MEMBER HAVING A BALANCE SPRING AND PROVIDED WITH TEMPERATURE-COMPENSATION MEANS

(71) Applicant: The Swatch Group Research and Development Ltd, Marin (CH)

(72) Inventors: Gianni Di Domenico, Neuchâtel (CH); Baptiste Hinaux, Lausanne (CH); Mohammad Hussein Kahrobaiyan, Boudevilliers (CH); Jean-Luc Helfer, Le Landeron (CH); Pascal Winkler, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 337 days.

(21) Appl. No.: 18/346,502

(22) Filed: Jul. 3, 2023

(65) Prior Publication Data

US 2024/0027966 A1 Jan. 25, 2024

(30) Foreign Application Priority Data

Jul. 21, 2022 (EP) .................................... 22186309

(51) Int. Cl.
*G04B 17/06* (2006.01)
*G04B 17/04* (2006.01)
*G04B 17/22* (2006.01)

(52) U.S. Cl.
CPC ........... *G04B 17/06* (2013.01); *G04B 17/045* (2013.01); *G04B 17/222* (2013.01)

(58) Field of Classification Search
None
See application file for complete search history.

(56) References Cited

U.S. PATENT DOCUMENTS 38,393 A * 5/1863 James .................... G04B 17/22 368/170
2016/0097436 A1 4/2016 Goold et al.
2019/0079453 A1* 3/2019 Haemmerli .......... G04B 17/066

FOREIGN PATENT DOCUMENTS

CH 704 687 A 9/2012
CH 717 283 B1 10/2021
(Continued)

OTHER PUBLICATIONS

Espacenet machine translation of CH 704687 (IDS cite 2). (Year: 2025).*
(Continued)

*Primary Examiner* — Regis J Betsch
*Assistant Examiner* — Michael James Walker
(74) *Attorney, Agent, or Firm* — Sughrue Mion, PLLC

(57) ABSTRACT

A regulating member (1) for a horological movement including an oscillating weight, for example a balance, and a balance spring including a flexible strip (2) wound about itself in a plurality of turns, the strip (2) having a predefined rigidity to allow the oscillating weight to undergo a rotary oscillatory motion, the strip (2) including an outer end (9), wherein the regulating member (1, 10) includes a temperature-compensating resilient device configured to adapt the stiffness thereof as a function of the temperature to compensate for the effect of temperature on the regulating member (1, 10), the resilient device including a resilient element (5) connecting the outer end (9) to a first support (7) that is stationary relative to the horological movement, as well as preloading means (6) for applying a variable force or torque to the resilient element (5) as a function of the temperature.

12 Claims, 1 Drawing Sheet

(56) References Cited

FOREIGN PATENT DOCUMENTS

| | | | | |
|---|---|---|---|---|
| CN | 201340553 Y | | 11/2009 | |
| EP | 4 009 115 A1 | | 6/2022 | |
| JP | 2019158844 A | * | 9/2019 | ........... G04B 17/222 |

OTHER PUBLICATIONS

Espacenet machine translation of CH 717283 (IDS cite 1). (Year: 2025).*
Machine translation of JP 2019-158844 (Year: 2025).*
Document retrieval failed notice dated Dec. 21, 2023 (Year: 2023).*
European Search Report for 22 18 6309, dated Nov. 14, 2022.

* cited by examiner

HOROLOGICAL REGULATING MEMBER HAVING A BALANCE SPRING AND PROVIDED WITH TEMPERATURE-COMPENSATION MEANS

CROSS REFERENCE TO RELATED APPLICATIONS

This application claims priority to European Patent Application No. 22186309.5 filed Jul. 21, 2022, the entire contents of which are incorporated herein by reference.

TECHNICAL FIELD OF THE INVENTION

The invention relates to a regulating member having a balance spring and provided with temperature-compensation means, in particular for the horological field.

TECHNOLOGICAL BACKGROUND

Most mechanical watches today are equipped with a sprung balance and a Swiss lever escapement mechanism. The sprung balance constitutes the time base of the watch. It is also referred to as a resonator or regulating member.

The escapement has two main functions:

to maintain the two-and-fro motions of the resonator;

to count these to-and-fro motions.

An inertial element, a guide and a resilient return element are required in order to constitute a mechanical resonator. Conventionally, a balance spring acts as a resilient return element for the inertial element constituted by a balance. This balance is guided in rotation by pivots, which generally rotate inside plain ruby bearings.

A frequency is chosen for the mechanical resonator, and is determined in order to obtain a predefined rate for the horological movement.

However, during operation, such a mechanical resonator can be subject to interference caused by changes in external parameters, which lead to variations in the frequency of the resonator. These parameters are, for example, the temperature, pressure, humidity or gravity. The variation in the frequency of the resonator results in an error in the measurement of time and thus in the rate of the horological movement.

Swiss patent document No. 704687 describes a regulating member comprising a balance spring and a member for correcting the position of the stud in order to correct deformations of the balance spring caused by certain parameters, in particular temperature.

Nonetheless, such a correction member does not achieve a desired precision level.

SUMMARY OF THE INVENTION

The purpose of the present invention is to overcome some or all of the aforementioned drawbacks by providing a horological regulating member having a balance spring provided with more precise temperature-compensation means.

To this end, the invention relates to a rotary regulating member for a horological movement comprising an oscillating weight, for example a balance, and a balance spring comprising a flexible strip wound about itself in a plurality of turns, the strip having a predefined rigidity to allow the oscillating weight to undergo a rotary oscillatory motion, the strip comprising an outer end.

The invention is noteworthy in that the regulating member comprises a temperature-compensating resilient device configured to adapt the stiffness thereof as a function of the temperature to compensate for the effect of temperature on the regulating member, the resilient device comprising a resilient element connecting the outer end to a first support that is stationary relative to the horological movement, as well as preloading means for applying a variable force or torque to the resilient element as a function of the temperature.

Thanks to the invention, the preloading means exert a variable force or torque on the resilient element as a function of the temperature, such that the regulating member maintains a substantially precise rate despite significant temperature changes. This is because, when the temperature changes, the preloading means modify the force or torque exerted on the resilient element so as to modify the stiffness of the assembly comprising the resilient element and the balance spring. By modifying the stiffness of this assembly, the rate of the regulating member is adjusted. As a result, when the temperature changes, the resilient device is mechanically impacted to adjust the rate of the balance spring to this change.

This resilient element modifies the rigidity of the attachment point and provides the resonator with additional flexibility. Thus, the effective rigidity of the resonator includes the rigidity of the strip and the rigidity of the resilient element. The variable force or torque allows the resilient element to be preloaded, preferably without preloading the strip and without displacing the end of the strip. By preloading the resilient element, the rigidity thereof changes, whereas the rigidity of the strip remains unchanged since it is not preloaded and since the end thereof is not displaced.

By changing the flexibility of the resilient element, the rigidity of the resonator (rigidity of the strip and rigidity of the resilient element) changes, which thus modifies the rate of the resonator. As the resilient element is preferably more rigid than the strip, the proportion of the rigidity of the resilient element in the overall rigidity is lower than that of the strip. As a result, a modification in the rigidity of the resilient element modifies the rigidity of the whole resonator, and thus finely regulates the rate thereof, allowing the frequency of our time base to be precisely adjusted. This provides a high degree of precision as regards maintaining the rate as a function of the temperature.

According to one specific embodiment of the invention, the preloading means comprise a spring part connected to the resilient element, the spring part transmitting the force or torque to the resilient element.

According to one specific embodiment of the invention, the preloading means comprise a body that can deform as a function of temperature, the deformable body being at least partially in contact with the spring part during the deformation.

According to one specific embodiment of the invention, the deformable body is an elongate bimetallic attachment.

According to one specific embodiment of the invention, the spring part comprises a first flexible blade connected to the resilient element.

According to one specific embodiment of the invention, the spring part comprises a translation stage connected to the first flexible blade, the deformable body being in contact with the translation stage.

According to one specific embodiment of the invention, the spring part comprises a second flexible blade connected to the thermally deformable body.

According to one specific embodiment of the invention, the regulating member extends substantially in one and the same plane.

According to one specific embodiment of the invention, the resilient element comprises a suspended point-shaped body and a pair of non-crossing blades connecting the suspended point-shaped body to the first stationary support.

According to one specific embodiment of the invention, the preloading means are connected to the suspended point-shaped body to exert the force or torque on the suspended point-shaped body.

According to one specific embodiment of the invention, the regulating member comprises means for regulating the preloading means so as to apply a variable force to the preloading means, for example to the first movable element.

The invention further relates to a horological movement including such a regulating member.

BRIEF DESCRIPTION OF THE FIGURES

The purposes, advantages and features of the present invention will become apparent after reading several embodiments, which are provided for purposes of illustration only and not intended to limit the scope of the invention, given with reference to the accompanying drawings, wherein.

DETAILED DESCRIPTION OF THE INVENTION

Figure 1:
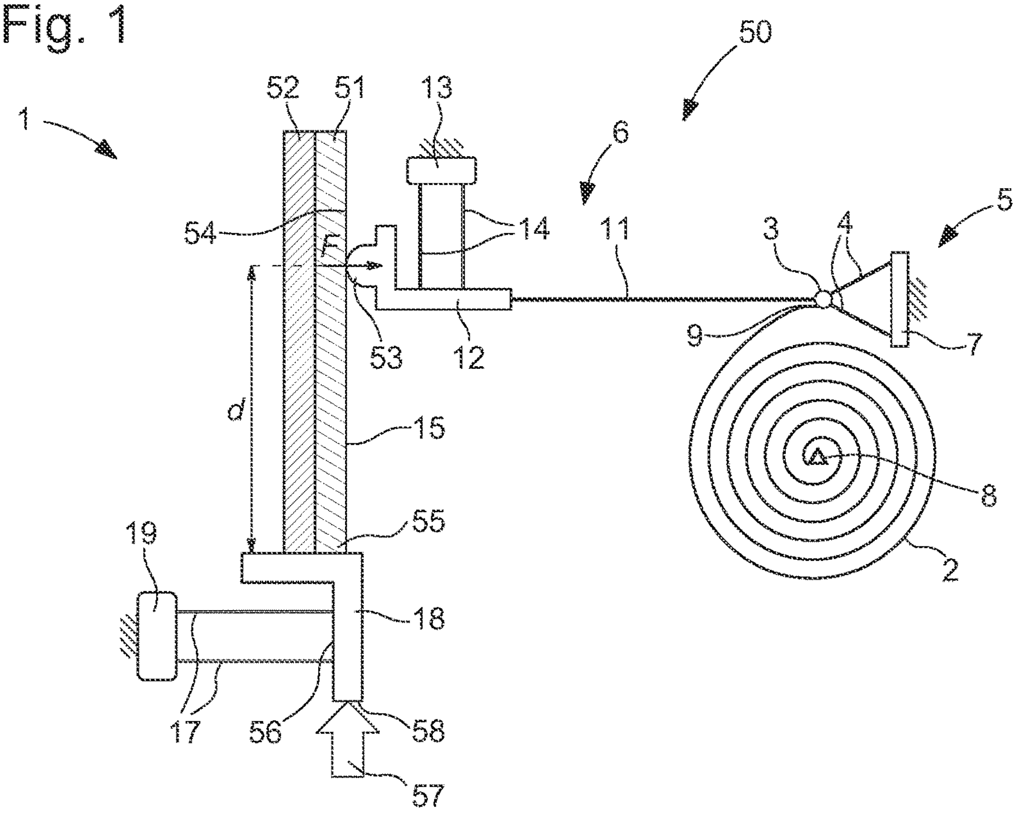
FIG. 1 is a diagrammatic top view of a regulating member according to a first embodiment of the invention.
Figure 2:
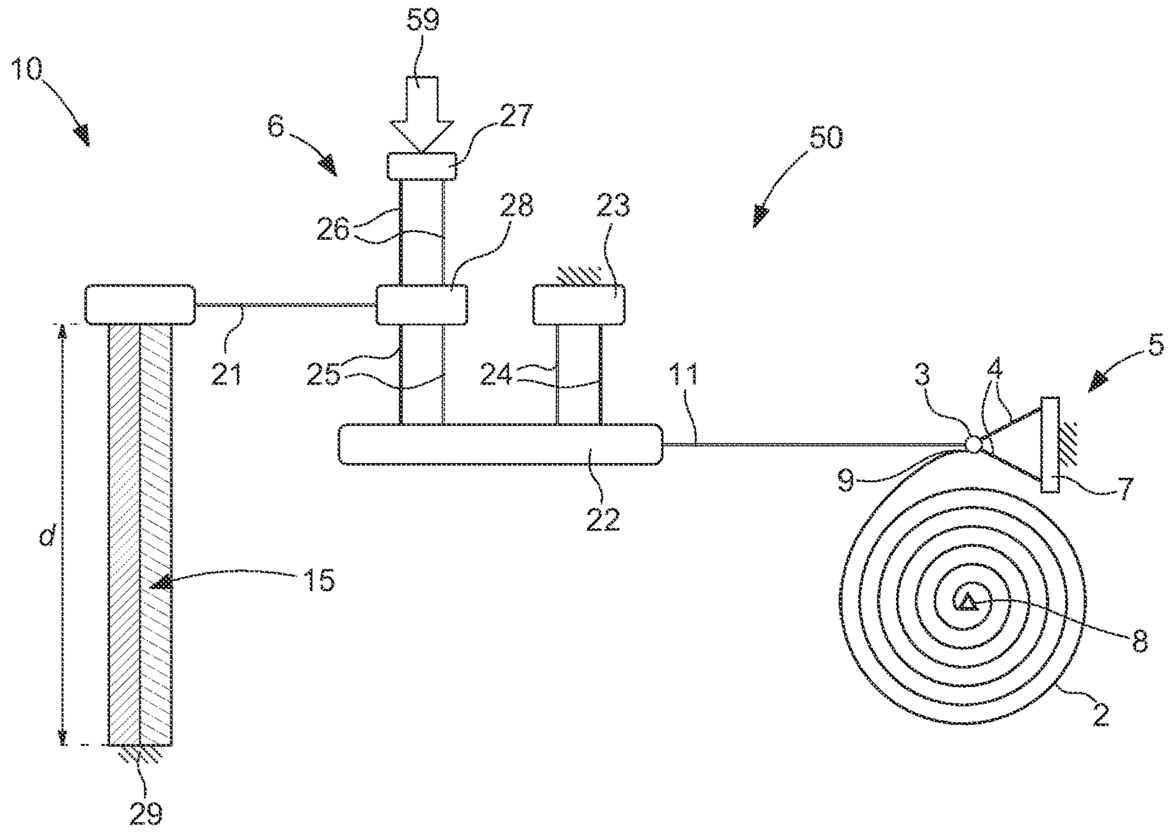
FIG. 2 is a diagrammatic top view of a regulating member according to a second embodiment of the invention.

FIGS. 1 and 2 show two embodiments of a regulating member according to the invention.

In both embodiments, the regulating member 1, 10 comprises a balance spring provided with a flexible strip 2 wound about itself in a plurality of turns. The flexible strip 2 comprises an outer end 9 and an inner end 8.

The regulating member 1, 10 comprises an oscillating weight, for example an annular balance, not shown in the figures, which is connected to the inner end 8 of the strip 2, the strip 2 having a predefined rigidity to enable the oscillating weight to undergo a rotary oscillatory motion. For example, the oscillating weight comprises an axial rotating shaft, the inner end 8 of the strip 2 being connected to said shaft.

Preferably, the regulating member 1, 10 extends substantially in the same plane, except for the oscillating weight, which oscillates in a parallel plane above the balance spring.

According to the invention, the regulating member 1, 10 comprises a resilient device 50 for compensating for an external parameter, which device is configured to adapt the stiffness of the resilient element 5 as a function of the temperature so as to compensate for the effect of temperature on the regulating member 1, 10.

The resilient device 50 comprises a resilient element 5 connecting the outer end 9 to a support 7 that is stationary relative to the horological movement, for example to a plate. The resilient device 50 further comprises preloading means 6 for applying a variable force or torque to the resilient element 5 as a function of the external parameter.

The resilient element 5 comprises, in this case, a suspended point-shaped body 3 and a pair of non-crossing blades 4 connecting the suspended point-shaped body 3 to the stationary support 7. The suspended point-shaped body 3 is, for example, a cylindrical body with a height substantially equal to the diameter, with the non-crossing blades 4 extending from the suspended point-shaped body 3 as far as the stationary support 7.

The resilient element 5 is arranged in the continuation of the flexible strip 2, the balance spring and the resilient element 5 being adjacent, but while avoiding contact during the oscillation of the oscillating weight.

The preloading means 6 are configured to exert the force or torque on the suspended point-shaped body 3. The preloading means 6 comprise a spring part provided with a flexible blade 11 connected to the suspended point-shaped body 3. The first flexible blade 11 extends along the axis of the resilient element, tangentially to the balance spring, and is slightly offset from the outer end 9.

In the first embodiment shown in FIG. 1, the spring part of the preloading means 6 comprises a translation stage provided with a first L-shaped movable element 12 and a second support 13 that is stationary relative to the movement. The first movable element 12 is connected to the flexible blade 11 by one end of a first arm of the L shape. The second arm of the L shape includes a rounded protrusion 53 on the outer side. The translation stage comprises two substantially parallel flexible blades 14 connecting the first movable element 12 to the second stationary support 13.

The preloading means 6 further include a thermally deformable body 15 that deforms as a function of temperature, the deformable body 15 exerting the variable force or torque on the movable element 12.

In this example, the thermally deformable body 15 is a bimetallic attachment whose deformation is caused by temperature. The bimetallic attachment has a body that extends longitudinally, and comprises two elongate parts 51, 52 joined longitudinally with one another. The two elongate parts 51, 52 are each made of a different material, with different thermal deformation properties from one another. Thus, under the effect of heat, the bimetallic attachment deforms laterally, one end 55 of the bimetallic attachment being retained, the other end being able to move and deform the bimetallic attachment so as to bend it on one side.

The bimetallic attachment is disposed perpendicular to the movable element 12, such that a first free part 54 is in contact with the protrusion 53 of the second arm of the L shape. The retained end 55 is held by a second translation stage comprising a second movable element 18 and a second pair 17 of parallel flexible blades connecting the second movable element 18 to a third support 19 that is stationary relative to the plate of the movement. The second movable element 18 is L-shaped, with one arm of the L shape supporting the retained end 55 of the bimetallic attachment, whereas the blades of the second pair 17 of blades connect the inner face 56 of the second arm to the third stationary support 19. The blades of the second pair 17 of blades are arranged perpendicular to the bimetallic attachment when the preloading means 6 are in the rest position.

In the event of a change in temperature, the deformable body 15, in this case the bimetallic attachment, bends or straightens, such that the first free part 54 exerts a greater or lesser force on the protrusion, and thus on the first movable element 12, which moves while being guided by the first translation stage. Thus, via the first flexible blade 11, the resilient element 5 receives a force or a torque modifying the stiffness thereof and thus the rate of the regulating member 1.

Regulating means, such as a screw, can be added to exert a force 57 on the second movable element 18, in particular at the end of the second arm 58, parallel to the longitudinal axis of the bimetallic attachment. The effective length d of the bimetallic attachment can thus be regulated in order to regulate the effect of the preloading means 6 on the resilient element 5, in particular as a function of temperature. By displacing the second movable element 18, which is guided by the second translation stage, the contact between the free part 54 and the protrusion 53 is modified, thus increasing or decreasing the effective length d of the bimetallic attachment. Therefore, the greater the effective length, the more the force exerted on the first moving element 12 varies as a function of temperature.

In the event of curved deformation of the deformable body 15, the free part 54 pushes the first movable element 12, such that the first flexible blade 11 transmits a force or torque to the suspended point-shaped body 3. The stiffness of the pair of non-crossing blades 4 is thus decreased. Conversely, if the deformable body 15 straightens, the force or a torque on the suspended point-shaped body 3 decreases, such that the stiffness of the pair of non-crossing blades 4 is increased.

In the second embodiment, the regulating member 10 comprises a balance spring, an oscillating weight (not shown in the figure), a resilient element 5, and a first flexible blade 11 that is identical to the first embodiment.

In order to exert the force or torque on the resilient element 5, the spring part of the preloading means 6 comprises a first elongate movable element 22, connected to the flexible blade 11 and disposed in the continuation thereof. A first pair of parallel flexible blades 24 connects the first movable element 22 to a second stationary support 23 to form a translation stage and guide the displacement of the first movable element 22.

The spring part comprises a second pair of parallel flexible blades arranged on the same side as the first pair of parallel flexible blades 24, and connects the first movable element 22 to a second movable element 28.

The second movable element 28 is laterally connected to the thermally deformable body 15 by a second flexible blade 21 substantially parallel to the first movable element 22 when the regulating member 10 is in the rest position.

In this embodiment, the deformable body is preferably also a bimetallic attachment arranged perpendicular to the second flexible blade 21 and to the first movable element 22. The second flexible blade 21 is connected to the tip of the free part of the bimetallic attachment, the latter end of the bimetallic attachment being held by a fixed support 29 at the base thereof.

Thus, when the bimetallic attachment bends or straightens, the second flexible blade 21 transmits a displacement to the second movable element 28, which transmits it to the first movable element 22 via the second pair of parallel flexible blades 25. The first movable element 22 is guided by the first translation stage to transmit the force or torque to the resilient element through the first flexible blade 11.

In a similar way to the first embodiment, the temperature variation will cause the thermally deformable body 15 to deform, and the stiffness of the resilient element 5 to change, and thus the rate of the regulating member to change.

A third pair of parallel flexible blades 26 connects the second movable element 28 to a third movable element 27. The third pair of parallel flexible blades 26 and the third movable element 27 are arranged in series with the second pair of parallel flexible blades 25 and the second movable element 28.

Regulating means, such as a screw, can be added to exert a force 59 on the third movable element 27. Increasing the force 59 causes the displacement of the bimetallic attachment to be transmitted to a lesser degree to the first movable element 22, and decreasing the force causes the displacement of the bimetallic attachment to be transmitted to a greater degree to the first movable element 22. The regulating means allow the sensitivity of the preloading means 6 to be regulated as a function of temperature.

The invention further relates to a horological movement, not shown in the figures, the movement comprising a rotary regulating member 1, 10 as described hereinabove.

It goes without saying that the invention is not limited to the embodiments described with reference to the figures and alternatives can be considered without leaving the scope of the invention.

The invention claimed is:

1. A regulating member for a horological movement comprising an oscillating weight and a balance spring comprising a flexible strip wound about itself in a plurality of turns, the strip having a predefined rigidity to allow the oscillating weight to undergo a rotary oscillatory motion, the strip comprising an outer end, wherein the regulating member comprises a temperature-compensating resilient device configured to adapt the stiffness thereof as a function of the temperature to compensate for the effect of temperature on the regulating member, the resilient device comprising:

a resilient element connecting the outer end to a first support that is stationary relative to the horological movement, and preloading means for applying a variable force or torque to the resilient element as a function of the temperature, wherein the resilient element is connecting the outer end to the preloading means.

2. The regulating member according to claim 1, wherein the preloading means comprise a spring part connected to the resilient element, the spring part transmitting the force or torque to the resilient element.

3. The regulating member according to claim 1, wherein the preloading means comprise a body that can deform as a function of temperature, the deformable body being at least partially in contact with the spring part during the deformation.

4. The regulating member according to claim 3, wherein the deformable body is an elongate bimetallic attachment.

5. The regulating member according to claim 4, wherein the spring part comprises a first flexible blade connected to the resilient element.

6. The regulating member according to claim 5, wherein the spring part comprises a translation stage connected to the first flexible blade, the deformable body being in contact with the translation stage.

7. The regulating member according to claim 5, wherein the spring part comprises a second flexible blade connected to the thermally deformable body.

8. The regulating member according to claim 1, wherein the regulating member extends substantially in one and the same plane.

9. A regulating member for a horological movement comprising an oscillating weight and a balance spring comprising a flexible strip wound about itself in a plurality of turns, the strip having a predefined rigidity to allow the oscillating weight to undergo a rotary oscillatory motion, the strip comprising an outer end, wherein the regulating member comprises a temperature-compensating resilient device configured to adapt the stiffness thereof as a function of temperature to compensate for the effect of temperature on the regulating member, the resilient device comprising a resilient element connecting the outer end to a first support that is stationary relative to the horological movement, as well as preloading means for applying a variable force or torque to the resilient element as a function of the temperature, and wherein the resilient element comprises a suspended point-shaped body and a pair of non-crossing blades connecting the suspended point-shaped body to the first stationary support.

10. The regulating member according to claim 9, wherein the preloading means are connected to the suspended point-shaped body so as to exert the force or torque on the suspended point-shaped body.

11. A regulating member for a horological movement comprising an oscillating weight and a balance spring comprising a flexible strip wound about itself in a plurality of turns, the strip having a predefined rigidity to allow the oscillating weight to undergo a rotary oscillatory motion, the strip comprising an outer end, wherein the regulating member comprises a temperature-compensating resilient device configured to adapt the stiffness thereof as a function of temperature to compensate for the effect of temperature on the regulating member, the resilient device comprising a resilient element connecting the outer end to a first support that is stationary relative to the horological movement, as well as preloading means for applying a variable force or torque to the resilient element as a function of the temperature, and wherein the regulating member further comprises means for regulating the preloading means so as to apply a variable force to the preloading means.

12. A horological movement comprising a regulating member according to claim 1.

* * * * *